United States Patent [19]

Spijkers et al.

[11] Patent Number: 6,028,019
[45] Date of Patent: Feb. 22, 2000

[54] WATER VAPOR PERMEABLE AND WATERPROOF POLYESTER MEMBRANE PIGMENTED WITH CARBON PARTICLES

[75] Inventors: Jozef Christiaan Wilhelmus Spijkers, Haan; Henricus Joannes Maria Van De Ven, Arnhem, both of Netherlands

[73] Assignee: Akzo Nobel, NV, Arnhem, Netherlands

[21] Appl. No.: 09/148,659

[22] Filed: Sep. 4, 1998

Related U.S. Application Data

[62] Division of application No. 08/778,369, Jan. 2, 1997, Pat. No. 5,859,083.

[30] Foreign Application Priority Data

Jan. 2, 1996 [DE] Germany ............... 196 00 007

[51] Int. Cl.⁷ .................................................. C08L 67/00
[52] U.S. Cl. .................. 442/395; 521/138; 521/149; 528/301; 264/41; 264/288.8; 264/DIG. 13; 442/287; 442/294; 442/315; 442/390
[58] Field of Search .................... 521/138, 149; 528/301; 264/41, 288.8, DIG. 13; 442/287, 294, 315, 390, 395

[56] References Cited

U.S. PATENT DOCUMENTS

| | | |
|---|---|---|
| 3,698,451 | 10/1972 | Hudson . |
| 3,766,146 | 10/1973 | Witsiepe . |
| 4,698,372 | 10/1987 | Moss . |
| 4,725,481 | 2/1988 | Ostapchenko . |
| 4,769,273 | 9/1988 | Hoeschele et al. ............ 428/215 |
| 4,908,260 | 3/1990 | Dodia et al. ............ 428/215 |
| 5,081,161 | 1/1992 | Ostapchenko . |

FOREIGN PATENT DOCUMENTS

| | | |
|---|---|---|
| 0 111 360 A1 | 6/1984 | European Pat. Off. . |
| 0 214 859 A2 | 3/1987 | European Pat. Off. . |
| 0 622 488 A1 | 2/1991 | European Pat. Off. . |
| 0 708 212 A1 | 4/1996 | European Pat. Off. . |
| 119 429 | 4/1976 | German Dem. Rep. . |
| 1 469 980 | 5/1969 | Germany . |
| 40 03 765 A1 | 8/1991 | Germany . |
| 363 149 | 8/1962 | Switzerland . |

OTHER PUBLICATIONS

K. Amellal et al; Performance Study of Barrier Screws in the Transition Zone; Polymer Engineering and Science, Mid–Mar., 1988, vol. 28, No. 5, pp. 311–320.

*Primary Examiner*—Helen L. Pezzuto
*Attorney, Agent, or Firm*—Oliff & Berridge, PLC

[57] ABSTRACT

A water vapor permeable, waterproof polyether ester membrane contains 1 to 10% by weight of finely dispersed carbon particles, especially soot particles, having an average size of 5 to 40 nm.

13 Claims, No Drawings

WATER VAPOR PERMEABLE AND WATERPROOF POLYESTER MEMBRANE PIGMENTED WITH CARBON PARTICLES

This is a Division of application Ser. No. 08/778,369 filed Jan. 2, 1997 now U.S. Pat. No. 5,859,083. The entire disclosure of the prior application is hereby incorporated by reference herein in its entirety.

BACKGROUND OF THE INVENTION

1. Field of Invention

The present invention relates to a water vapor permeable and waterproof polyether ester membrane that is pigmented with carbon particles, as well as its manufacture and use.

2. Description of Related Art

The manufacture of films from polymers that contain carbon particles and are intended to be waterproof and water vapor permeable is known.

Films of this type are disclosed, for example, in the European patent specification EP-A2-0214859. The films are microporous, contain 20 to 40% of a filler that can, among other things, be carbon (e.g., carbon black). The films are stretched and the particle size of the deposited carbon particles is about 0.05 to 50 μm. However, it has been discovered that these films are not completely waterproof after all.

As disclosed in DE-A1-4003765, a water vapor permeable and waterproof material consisting of a carrier material onto which a membrane has been applied, and which has no pores, has been manufactured. Adsorber particles are made to adhere to this membrane. The adsorber particles can be activated carbon, which, for example, has an average diameter of 0.1 to 1 mm.

However, membranes or films of this kind have a series of disadvantages. First, the distribution of the carbon particles in the polymer leaves much to be desired. Second, such pigmented films or membranes do not achieve certain properties that various applications require, such as high ultraviolet ("UV") stability and favorable infrared ("IR") reflectance properties.

Thus, although a whole series of films and membranes pigmented with carbon is known, there remains a need for improved water vapor permeable and waterproof membranes and processes by which such membranes can advantageously be manufactured.

The object of the present invention is therefore to provide a water vapor permeable, waterproof membrane that is very homogeneous, has good UV stabilities and elevated IR reflectance, and that can be put to a variety of uses.

DETAILED DESCRIPTION OF PREFERRED EMBODIMENTS

The present invention is directed to a water vapor permeable and waterproof polyether ester membrane containing 1 to 10% by weight of total membrane weight of finely dispersed carbon particles with an average size of about 5 to 40 nm. In embodiments, it is preferable for the carbon particles to be soot. The concentration of the dispersed carbon particles in the membrane is preferably 2 to 5% by weight of total membrane weight. The average particle size of the carbon particles is preferably 15 to 25 nm.

The present invention is also directed to a process for the manufacture of a water vapor permeable, waterproof polyether ester membrane in which a concentrate containing up to 40% by weight of total concentrate weight of carbon particles is manufactured by melting a polyether ester and, under high shear forces, by distributing the carbon particles that have an average size of 5 to 40 nm. The concentrate, in solid or fluid form, is then incorporated into additional polyether ester and this polyether ester mass containing carbon particles is processed to obtain a water vapor permeable, waterproof membrane.

In the process according to the present invention, it has proved advantageous to manufacture a concentrate with up to 35% by weight of concentrate weight of carbon particles, and preferably up to 30% by weight of concentrate weight of carbon particles, in the polyether ester. It is preferable if a concentrate has at least 15% by weight of carbon particles, more preferable if a concentrate has at least 20% by weight in the polyether ester. In order to manufacture the concentrate, a polyether ester polymer is preferably used that possesses a relative viscosity of η=3.5 to 4.2, measured in meta-cresol.

The water vapor permeable, waterproof polyether ester membranes according to the present invention can be used most advantageously in the manufacture of (1) textile or technical laminates, particularly in clothing; (2) camouflaged clothing or in the manufacture of flat structures used for camouflage purposes; and (3) roof lining sheets.

The polyether esters employed in the manufacture of the membrane according to the present invention are preferably copolyether esters that are derived from longer-chain polyglycols and short-chain glycols with 2 to 4 carbon atoms and dicarboxylic acids. The polymers are preferably copolyether esters that consist of a large number of repetitive, intralinear long-chain and short-chain ester units, which are statistically linked head to tail through ester bonds. The long-chain ester units correspond to the formula

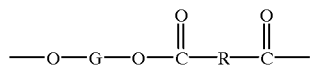

and the short-chain ester units correspond to the formula

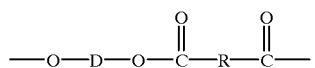

wherein G represents a divalent fragment remaining after terminal hydroxyl groups are removed from at least one long-chain glycol with an average weight average molecular weight of 600 to 6000 and an atomic carbon-to-oxygen ratio of between 2.0 and 4.3. At least 20% by weight of the long-chain glycol has an atomic carbon-to-oxygen ratio of between 2.0 and 2.4 and makes up 15 to 50% by weight of the copolyether ester. R represents a divalent fragment remaining after the removal of carboxyl groups from at least one dicarboxylic acid having a weight average molecular weight of less then 300. D represents a divalent fragment remaining after the removal of hydroxyl groups from at least one diol having a weight average molecular weight of less than 250, wherein at least 80 mole percent of the dicarboxylic acid consists of terephthalic acid or its equivalents that form esters. At least 80 mole percent of the diol having a molecular weight less than 250 consists of 1,4-butanediol or its equivalents that form esters.

The sum of the mole percents of the dicarboxylic acid that does not represent terephthalic acid or its equivalents that form esters, and the diol having a molecular weight less than 250 that does not represent 1,4-butanediol or its equivalents that form esters, is not more than 20 mole percent and the short-chain ester units comprise 40–80 percent by weight of the copolyether ester.

Moreover, in embodiments, polyether esters are preferred in which the polymers are wholly or partly copolyether esters in which (1) at least 70 mole percent of the dicarboxylic acid is 2,6-naphthalene dicarboxylic acid, or its equivalents that form esters, and (2) at least 70 mole percent of the diol having a molecular weight less than 250 is 1,4-butanediol or its equivalents that form esters. The sum of the mole percents of the dicarboxylic acid that is not 2,6-naphthalene dicarboxylic acid, or its equivalents that form esters and of the diol having a molecular weight less than 250 that is not 1,4-butanediol or its equivalents that form esters, is not more than 30 mole percent, and the ester units with short chains comprise 35–80 percent by weight of the copolyether ester.

In addition, the polymers can be copolyether esters which consist of a large number of intralinear, repetitive long-chain and short-chain ester units, which are linked statistically head to tail by ester bonds. The long-chain ester units correspond to the formula

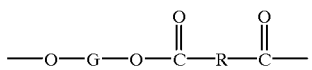

and the short-chain ester units correspond to the formula

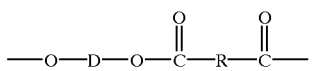

wherein G represents a divalent fragment remaining after terminal hydroxyl groups are removed from at least one long-chain glycol with an average weight average molecular weight of 600 to 4000 and an atomic carbon-to-oxygen ratio of between 2.0 and 4.3. At least 20% by weight of the long-chain glycol has an atomic carbon-to-oxygen ratio of between 2.0 and 2.4 and comprises 15 to 50% by weight of the copolyether ester. R represents a divalent fragment remaining after the removal of carboxyl groups from at least one dicarboxylic acid with a weight average molecular weight of less then 300. D represents a divalent fragment remaining after the removal of hydroxyl groups from at least one diol having a weight average molecular weight of less than 250, where at least 70 mole percent of the dicarboxylic acid consists of 2,6-naphthalene dicarboxylic acid or its equivalents that form esters and at least 70 mole percent of the diol having a molecular weight less than 250 consist of 1,4-butanediol or its equivalents that form esters.

The sum of the mole percents of the dicarboxylic acid that is not 2,6-naphthalene dicarboxylic acid or its equivalents that form esters, and the diol having a molecular weight less than 250 that is not 1,4-butanediol or its equivalents that form esters, is not more than 30 mole percent, and the short-chain ester units comprise 35–80 percent by weight of the copolyether ester.

The polyether esters described above can be used both in the manufacture of the concentrate and in the polyether ester into which the concentrate is incorporated.

The quantity of carbon particles that can be incorporated into the polyether ester for the manufacture of the concentrate can vary across a wide range. In embodiments, it is possible to incorporate concentrations up to 40% by weight carbon, especially soot, into the concentrate.

In embodiments, high shear forces are employed in the manufacture of the concentrate in order to guarantee that the carbon particles are dispersed as homogeneously as possible in the polyether ester. Double screw extruders such as, for example, the ZSK-30 extruder supplied by Werner und Pfleiderer, Stuttgart, have proved most advantageous for this purpose. The ZSK-30 extruder is especially recommended with a double screw, three kneading blocks in the heating zone, and three more kneading blocks in the mixing zone.

The quantity of carbon particles in the concentrate depends, among other things, on the planned application and can easily be adapted to the application areas concerned. It may, of course, be advantageous for the concentrate to incorporate the maximum possible quantity of soot. The viscosity of the polyether ester used in the manufacture of the concentrate should be as high as possible. The relative viscosity of the polymer is preferably about $\eta=3.5$ to 4.2, although higher and lower values are possible. The relative viscosity is that which is measured in meta-cresol.

The concentrate can be added directly to the additional polyether ester in fluid form and should be mixed well with it. In embodiments, it has proved most favorable for the incorporation of the concentrate into the polyether ester to be performed under high shear forces. Appropriate melting and mixing devices suitable within the scope of the present invention are disclosed, for example, in Polymer Engineering and Science, Mid-March 1988, Vol. 28, No. 5, pages 311 to 320, the entire disclosure of which is incorporated herein by reference. Particularly suitable for the purposes of the present invention are extruders obtainable from relevant commercial sources under the names "Barr Extruder" or "Maillefer Extruder." Devices of this kind are disclosed in, for example, Swiss Patent 363,149 and in the U.S. Pat. No. 3,698,451, the entire disclosures of which are incorporated herein by reference.

The polyether ester mass thus made is then processed in a manner that is well known to water vapor permeable and waterproof membranes. Of course, it is also possible to first process the concentrate into granules, powders, and the like, and only later to use it in the manufacture of water vapor permeable, waterproof membranes.

The added quantity of concentrate is measured in such a way that the water vapor permeable, waterproof polyether ester membrane produced contains a proportion of 1 to 10% by weight of total membrane weight of finely dispersed carbon particles. The incorporated carbon particles, particularly soot, have an average size of about 5 to 40 nm. Soot particles with this average size are available commercially and are simple to manufacture.

It is especially surprising to find that the water vapor permeable and waterproof polyether ester membranes manufactured according to the present invention maintain their excellent properties, namely their water vapor permeability and simultaneous waterproof properties, even though carbon particles are deposited in them. Furthermore, the membranes are characterized by an unexpectedly high UV stability. Two to three-fold improvements and greater in UV stability are achievable.

The structure of the membranes is very homogeneous. The structure is not microporous and is therefore particularly suitable for varied applications.

It must be emphasized that the membranes of the present invention react favorably to infrared radiation. Their IR reflectance properties have been improved so that the membranes are excellently suitable for applications in which a corresponding IR reflectance is desired (e.g., especially in textile and technical flat structures used for camouflage purposes). Other applications include, but are not limited to, camouflaged clothing, tarpaulins used in the manufacture of truck tarpaulins for covering purposes, in the manufacture of tents, and the like.

A further advantageous application area for the membranes according to the present invention are roof lining sheets. Membranes are used in constructing roof structures not only to guarantee that the roof is waterproof, but also to give a special favorable climate as these lining sheets are water vapor permeable. For example, water vapor that forms in lofts can be given off to the outside, while water that might have come in through the roof tiles is kept out. In addition, the roof lining sheets are suitable for keeping out wind, which is a great advantage in lofts. The roof lining sheets are preferably composed of the polyether ester membrane and a nonwoven fabric, i.e., they are used in the form of laminates. The good UV stability of the membranes is advantageous (e.g., if the lining sheets are directly exposed to weather for a time because the roof tiles could not yet be attached).

The polyether ester membranes can be used in a manner that is well known in the manufacture of textile or technical laminates. They can be connected to textile or technical flat structures such as woven fabrics, knitted fabrics, especially knit goods, and the like, and nonwoven fabrics. The connection can be effected by gluing at points, in patterns, in grids or networks. The membranes in accordance with the present invention can also be produced directly in their manufacture by extrusion onto textile or technical flat structures.

The membranes according to the present invention are also characterized by good anti-static properties, so that they can be used in special clothing including, but not limited to, single-material clothing (i.e., clothing consisting especially of polyester besides the polyether ester), protective working clothes, clothing required in so-called clean rooms, and the like.

In accordance with the present invention, membranes with a thickness of 5–50 μm can be made, for example. It is thus possible to manufacture on the one hand very thin membranes with a thickness of 5 to 15 μm, for example, which are especially advantageous in the clothing sector, and on the other hand to manufacture thicker membranes with a thickness of 20 to 50 μm, for example, for technical applications such as roof lining sheets. Multi-layered membranes in which one or more of the layers is a membrane in accordance with the present invention can also be manufactured. Here, a co-extrusion process has proved especially advantageous, as disclosed, for example, in U.S. Pat. No. 4,725,481, the entire disclosure of which is incorporated herein by reference.

What is claimed is:

1. A water vapor permeable and waterproof membrane comprising polyether ester and 1 to 10% by weight of said membrane of finely dispersed carbon particles having an average size of 5 to 40 nm.

2. The membrane in accordance with claim 1, wherein the carbon particles are soot.

3. The membrane in accordance with claim 1, wherein said membrane comprises 2 to 5% by weight of said membrane of said carbon particles.

4. The membrane in accordance with claim 2, wherein said membrane comprises 2 to 5% by weight of said membrane of said soot.

5. The membrane in accordance with claim 1, wherein said carbon particles have an average size of 15 to 25 nm.

6. The membrane in accordance of claim 1, wherein said polyether ester comprises a copolyether ester comprising long-chain and short-chain ester units.

7. The membrane in accordance of claim 6, wherein said long-chain ester unit is represented by the following general formula

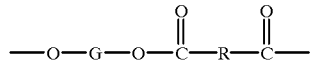

wherein,

G represents a divalent fragment remaining after terminal hydroxyl groups are removed from at least one long-chain glycol with an average weight average molecular weight of 600 to 6000 and an atomic carbon-to-oxygen ratio of between 2.0 and 4.3; and R represents a divalent fragment remaining after the removal of carboxyl groups from at least one dicarboxylic acid having a weight average molecular weight of less then 300.

8. The membrane in accordance of claim 6, wherein said short-chain ester unit is represented by the following general formula

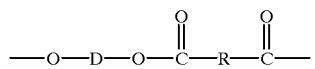

wherein,

R represents a divalent fragment remaining after the removal of carboxyl groups from at least one dicarboxylic acid with a weight average molecular weight of less then 300; and D represents a divalent fragment remaining after the removal of hydroxyl groups from at least one diol having a weight average molecular weight of less than 250.

9. A textile or technical laminate comprising the membrane in accordance with claim 1.

10. Clothing comprising a textile laminate in accordance with claim 9.

11. Camouflaged articles comprising the membrane in accordance with claim 1, wherein said articles are selected from the group consisting of clothing, flat structures, tarpaulins and nets.

12. A roof lining sheet comprising the membrane in accordance with claim 1.

13. A membrane in accordance with claim 1, wherein said membrane has a thickness of 5–30 μm.

* * * * *